United States Patent
Sehmer et al.

(10) Patent No.: US 6,777,060 B2
(45) Date of Patent: Aug. 17, 2004

(54) VEHICLE CARPET SYSTEM WITH FLOOR MAT RETENTION APPARATUS

(75) Inventors: Steve Sehmer, Canton, OH (US); Fiona Doskocz, Northville, MI (US); T. J. Allison, Old Fort, NC (US); Thomas W. McIntyre, Studio City, CA (US); James H. Schield, La Habra, CA (US)

(73) Assignee: Collins & Aikman Products Co., Troy, MI (US)

( * ) Notice: Subject to any disclaimer, the term of this patent is extended or adjusted under 35 U.S.C. 154(b) by 21 days.

(21) Appl. No.: 10/262,188

(22) Filed: Oct. 1, 2002

(65) Prior Publication Data

US 2004/0062905 A1 Apr. 1, 2004

(51) Int. Cl.$^7$ .......... B32B 33/00; A44B 21/00; A41G 27/04; B62D 25/20
(52) U.S. Cl. .......... 428/95; 428/137; 24/351; 24/352; 24/353; 16/4; 296/97.23
(58) Field of Search .......... 428/95, 86, 88, 428/131, 137; 24/351–353, 289, 297; 16/4, 8; 296/97.23; 411/366.1, 366.2, 368, 338, 339

(56) References Cited

U.S. PATENT DOCUMENTS

| | | | |
|---|---|---|---|
| 3,930,084 A | 12/1975 | Shields | 428/67 |
| 4,403,895 A | 9/1983 | Caldwell et al. | 411/378 |
| 4,499,636 A * | 2/1985 | Tanaka | 24/289 |
| 4,751,764 A | 6/1988 | Reuben | 16/8 |
| 4,829,627 A * | 5/1989 | Altus et al. | 16/4 |
| 4,921,742 A | 5/1990 | Altus | 428/81 |
| 5,003,664 A | 4/1991 | Wong | 16/6 |
| 5,093,958 A | 3/1992 | Levine | 16/4 |
| 5,192,599 A | 3/1993 | Sakamoto | 428/82 |
| 5,384,939 A * | 1/1995 | Weber | 24/306 |
| 5,390,397 A | 2/1995 | Kremer et al. | 24/662 |
| 5,666,691 A * | 9/1997 | Bealing et al. | 16/4 |
| 5,775,859 A * | 7/1998 | Anscher | 411/38 |
| 6,155,629 A | 12/2000 | Sherman | 296/97.23 |
| 6,497,003 B2 * | 12/2002 | Calabrese | 16/4 |

FOREIGN PATENT DOCUMENTS

| | | | | |
|---|---|---|---|---|
| DE | 3632618 A1 * | 4/1988 | | B60N/3/04 |
| DE | 20021104 U1 * | 3/2001 | | A47G/27/04 |
| DE | 19617408 A1 * | 2/2003 | | A47G/27/04 |
| GB | 2259005 A * | 3/1993 | | B60N/3/04 |
| WO | WO 200136227 A2 * | 5/2001 | | A47G/27/04 |

OTHER PUBLICATIONS

Webpage printout of www.autoseattle.com/lloydmats2 describing Lloyd Ultimats.*
Webpage printout of www.autoseattle.com/floormats4 describing Designer Mat, Custom Embroidered Floor Mats.*

* cited by examiner

Primary Examiner—Cheryl A. Juska
(74) Attorney, Agent, or Firm—Myers Bigel Sibley & Sajovec

(57) ABSTRACT

Apparatus are provided for securing floor mats to vehicle carpets and include a back plate that underlies a vehicle carpet, a top plate that overlies a floor mat, and fasteners that are configured to removably secure the back and top plates together such that the carpet and floor mat are sandwiched therebetween. The top plate has an upper surface that has promotional indicia thereon.

29 Claims, 3 Drawing Sheets

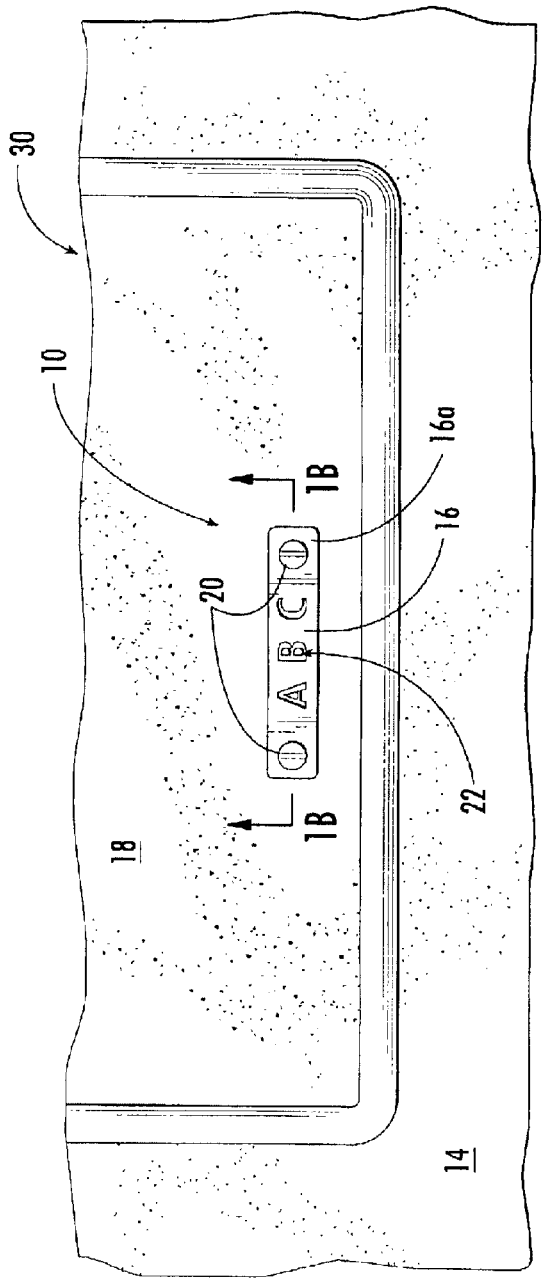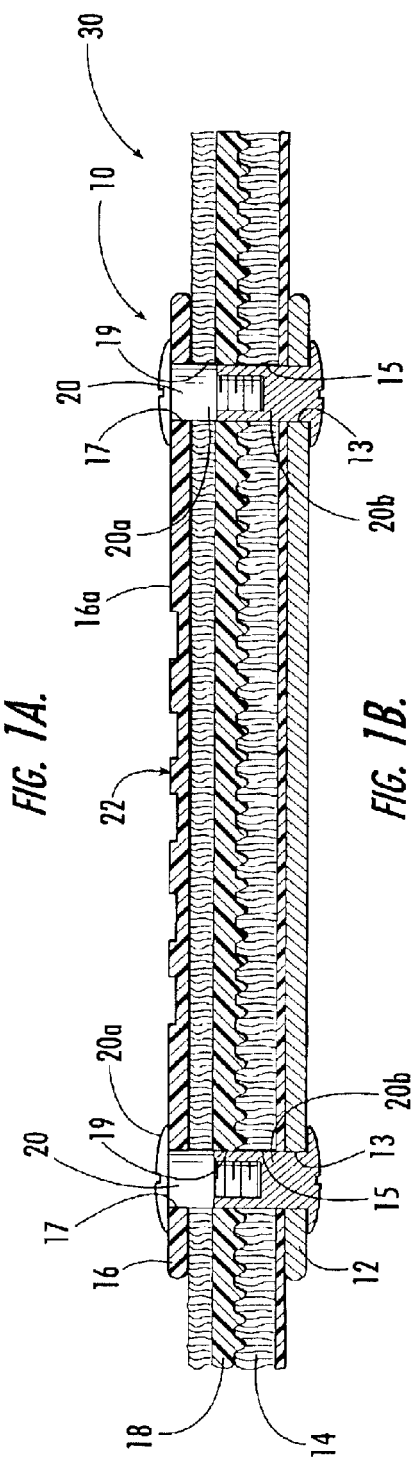

VEHICLE CARPET SYSTEM WITH FLOOR MAT RETENTION APPARATUS

FIELD OF THE INVENTION

The present invention relates generally to vehicles and, more particularly, to vehicle floor mats.

BACKGROUND OF THE INVENTION

It is often desirable to place a floor mat on top of carpet within a vehicle in order to keep the vehicle carpet clean and to reduce wear and tear thereof. Unfortunately, floor mats may be subjected to twisting motions from the entrance and exit of vehicle occupants which can cause slippage. Such slippage may lead to injury of an occupant when entering or exiting from a vehicle. In addition, a floor mat may slip over a vehicle carpet so as to become jammed under the accelerator, brake, or clutch pedals of the vehicle preventing proper operation thereof which may present a bothersome and possibly dangerous condition.

Various ways of securing floor mats to vehicle carpeting to prevent slippage thereon are known. For example U.S. Pat. No. to Altus et al. describes a floor mat retainer having an upper surface, a lower surface, a plurality of male fasteners depending upwardly from the upper surface, and bristles depending downwardly from the lower surface. The retainer lower surface is placed on top of a vehicle carpet, and a floor mat, having a plurality of openings therein, is placed on top of the retainer upper surface so that the openings fit over the respective male fasteners. Female fasteners, are placed over the top of the male fasteners to fasten the floor mat to the retainer. The male fasteners are formed integrally with the retainer.

U.S. Pat. No. 5,003,664 to Wong describes a clip for securing a mat to a carpet that has a main portion and a spike extending from the main portion. The spike is inserted into the carpet such that it underlies the carpet with the main portion exposed atop the carpet. Means are provided to secure the mat to the main portion using a hook and loop type fastener. The hook portion is provided on the main portion and the loop portion is provided on the downwardly facing surface of the mat.

U.S. Pat. No. 4,403,895 to Caldwell et al. describes a floor mat retainer that is configured to be secured to mass backed carpet installed on the floor of a vehicle. A vehicle floor mat is releasably secured to the retainer by insertion of a portion of the retainer through an opening in the floor mat.

SUMMARY OF THE INVENTION

In view of the above discussion, apparatus for securing floor mats to vehicle carpets are provided. According to an embodiment of the present invention, an apparatus for securing a floor mat to a vehicle carpet includes a back plate that underlies a vehicle carpet, a top plate that overlies a floor mat, and fasteners that are configured to removably secure the back and top plates together such that the carpet and floor mat are sandwiched therebetween. The top plate has an upper surface that has promotional indicia (e.g., vehicle logo, sports team logo, etc.) thereon. Each fastener includes an upper portion and a lower portion that are configured to threadingly engage with each other.

According to embodiments of the present invention, an apparatus for securing a floor mat to a vehicle carpet includes a back plate having an aperture formed therethrough, a fastener, and a top plate. The fastener includes a lower portion that extends through the back plate aperture and respective apertures in a carpet and floor mat, and an upper portion that extends through the floor mat aperture. The fastener upper portion is removably secured to the fastener lower portion such that the carpet and floor mat are sandwiched between the upper and lower portions. The fastener upper portion has a free end that extends above the floor mat and that includes a circumferentially extending ridge. The top plate is removably secured to the upper portion free end. The top plate has a female adapter that is configured to engage the ridge and removably secure the top plate to the fastener. The top plate may be configured to apply compressive force on the floor mat to facilitate sandwiching the floor mat and vehicle carpet together. The top plate has an upper surface that has promotional indicia thereon.

According to embodiments of the present invention, an apparatus for securing a floor mat to a vehicle carpet includes a back plate having an aperture formed therethrough, a retention post having an enlarged end and a free end, and a top plate configured to be removably secured to the retention post free end such that the carpet and floor mat are sandwiched between the top and back plates. The retention post free end extends through the back plate aperture and respective apertures in a vehicle carpet and floor mat. The top plate has a female adapter that is configured to snugly engage the retention post free end and removably secure the top plate to the retention post. The female adapter includes a cylindrical chamber having a circumferentially-extending channel formed in a wall thereof. The retention post includes a circumferentially-extending ridge adjacent the free end. The diameter of the ridge is slightly larger than the diameter of the cylindrical chamber. The female adapter is configured to expand slightly to allow the ridge to move into the cylindrical chamber and engage the channel, resulting in a removable, snug fit between the retention post and the top plate. The top plate may be configured to apply compressive force on the floor mat to facilitate securing the floor mat and vehicle carpet together. The top plate has an upper surface that has promotional indicia thereon.

According to embodiments of the present invention, an apparatus for securing a floor mat to a vehicle carpet includes a back plate having a retention post extending therefrom and a top plate that is configured to be removably secured to the retention post such that the carpet and floor mat are sandwiched between the top and back plates. The retention post includes a free end having a circumferentially extending ridge. The free end extends through respective apertures in a vehicle carpet and floor mat. The top plate has a female adapter that is configured to engage the ridge and removably secure the top plate to the retention post. The top plate may be configured to apply compressive force on the floor mat to facilitate sandwiching the floor mat and vehicle carpet together. The retention post also includes a tapered intermediate portion between the free end and the back plate. The tapered intermediate portion has a radially extending shoulder. A retainer plate is utilized to secure the back plate to the carpet by being positioned between the retention post tapered portion shoulder and the carpet. The top plate has an upper surface that has promotional indicia thereon.

According to embodiments of the present invention, an apparatus for securing a floor mat to a vehicle carpet includes a retention post, a retention clip that is configured to underlie the carpet, and a top plate that is configured to be removably secured to the retention post such that the carpet and floor mat are sandwiched between the top plate and retention clip. The retention post includes opposite first and second free end portions and an intermediate portion between the first and second end portions. A circumferentially-extending slot is formed within the retention post adjacent the second end, and the retention post intermediate portion includes a radially extending flange. The retention post is configured to extend through respective apertures in a vehicle carpet and floor mat such that the radially extending flange is disposed between the floor mat and the carpet. A retention clip is secured within the slot so as to underlie the carpet. The retention post first end portion includes a circumferentially extending ridge. The first end extends through respective apertures in a vehicle carpet and floor mat. The top plate has a female adapter that is configured to engage the ridge and removably secure the top plate to the retention post first end.

BRIEF DESCRIPTION OF THE DRAWINGS

The accompanying drawings, which form a part of the specification, illustrate key embodiments of the present invention. The drawings and description together serve to fully explain the invention.

FIG. 1A is a top plan view of an apparatus for securing a floor mat to a vehicle carpet according to embodiments of the present invention.

FIG. 1B is a cross-sectional view of the apparatus of FIG. 1A taken along lines 1B—1B.

DETAILED DESCRIPTION OF THE INVENTION

Figure 2A:
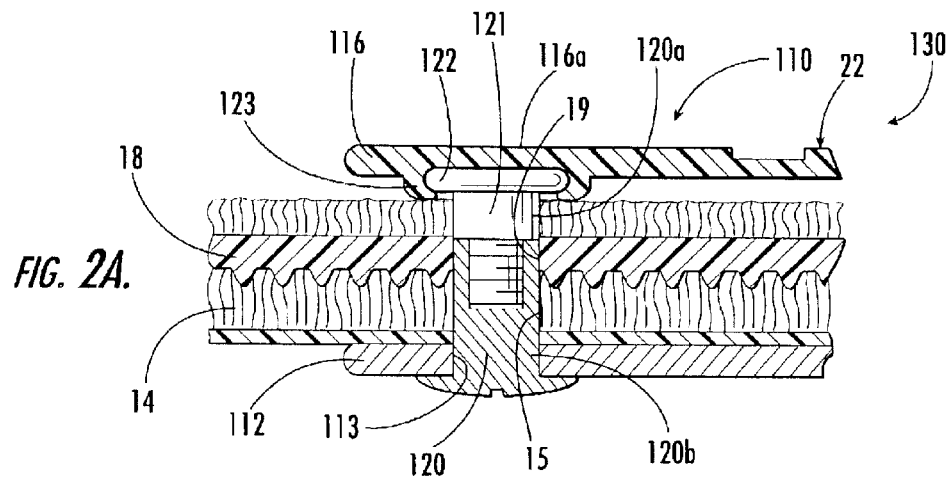
FIGS. 2A–2B and 3A–3B are partial cross-sectional views of apparatus for securing a floor mat to a vehicle carpet according to other embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Referring to FIGS. 1A–1B, an apparatus 10 for securing a floor mat to a vehicle carpet in face-to-face contacting relationship, according to embodiments of the present invention, is illustrated. The illustrated apparatus 10 includes a back plate 12 that underlies a vehicle carpet 14, a top plate 16 that overlies a floor mat 18, and fasteners 20 that are configured to removably secure the back and top plates 12, 16 together such that the carpet 14 and floor mat 18 are sandwiched therebetween.

The illustrated back and top plates 12, 16 have an elongated, generally rectangular configuration. However, embodiments of the present invention are not limited to the illustrated configuration. The back and top plates 12, 16 may have any shape, size and configuration, without limitation. The illustrated back and top plates 12, 16 each have a respective pair of apertures 13, 17 formed therethrough. These apertures 13, 17 align with each other and with respective apertures 15, 19 in the vehicle carpet 14 and floor mat 19 such that the fasteners 20 can be inserted therethrough.

Embodiments of the present invention are not limited to the illustrated number of apertures in the back and top plates 12, 16, nor to the illustrated fasteners 20 used to removably secure the back and top plates 12, 16 together. A single fastener 20 and single corresponding apertures 13, 17 in the back and top plates 12, 16 may be utilized. Moreover, more than two fasteners, thereby requiring more than two apertures in the back and top plates 12, 16 may be utilized.

In the illustrated embodiment, the top plate 16 has an upper surface 16a that has promotional indicia 22 thereon. There is no limitation to what the promotional indicia 22 may be. For example, the promotional indicia 22 may be a vehicle logo, a favorite sports team, etc. In addition, the back and top plates 12, 16 may be formed from various types of materials including, but not limited to, polymeric materials, metals, wood, etc.

In the illustrated embodiment, each fastener 20 includes an upper portion 20a and a lower portion 20b that are configured to threadingly engage with each other. However, embodiments of the present invention are not limited to the illustrated fasteners 20. Various types of fasteners may be utilized. Moreover, according to other embodiments of the present invention, a portion of each fastener 20 may be integrally formed with either the back or top plates 12, 16.

In FIGS. 1A–1B, 30 designates a carpet system that includes the above-described apparatus 10 and the vehicle carpet 14 and floor mat 18 sandwiched therebetween.

FIGS. 2A–2B and 3A–3B illustrate additional, respective embodiments of apparatus for securing floor mats to vehicle carpets. Referring to FIG. 2A, an apparatus 110 for securing a floor mat to a vehicle carpet in face-to-face contacting relationship, according to embodiments of the present invention, is illustrated. The illustrated apparatus 110 includes a back plate 112 having an aperture 113 formed therethrough, a fastener 120, and a top plate 116. Although only a single fastener, and a corresponding single aperture 113 in back plate 112 are illustrated, it is understood that embodiments of the present invention may utilize multiple fasteners 120 and corresponding apertures in the back plate 112.

The illustrated fastener 120 includes a lower portion 120b that extends through the back plate aperture 113 and respective apertures 15, 19 in a carpet 14 and floor mat 18, and an upper portion 120a that extends through the floor mat aperture 19. The fastener upper portion 120a is removably secured to the fastener lower portion 120b such that the carpet 14 and floor mat 18 are sandwiched between the upper and lower portions 120a, 120b. In the illustrated embodiment, fastener upper and lower portions 120a, 120b are configured to threadingly engage with each other. However, other means for removably securing the fastener upper and lower portions 120a, 120b may be utilized without limitation. Moreover, according to embodiments of the present invention, the fastener lower portion 120b may be integrally formed with the back plate 12.

In the illustrated embodiment, the fastener upper portion 120a has a free end 121 that extends above the floor mat 18 and that includes a circumferentially extending ridge 122. The top plate 116 is removably secured to the upper portion free end 121. The top plate 116 has a female adapter 123 that is configured to engage the ridge 122 and removably secure the top plate 116 to the fastener 120. The top plate 116 may be configured to apply compressive force on the floor mat 18 to facilitate sandwiching the floor mat 18 and vehicle carpet 14 together. Various configurations known to those skilled in the art may be utilized to removably secure the top plate 116 to the fastener free end 121. Embodiments of the present invention are not limited to the illustrated fastener free end configuration or to the top plate female adapter configuration.

In the illustrated embodiment, the top plate 116 has an upper surface 116a that has promotional indicia 22 thereon. There is no limitation to what the promotional indicia may be. For example, the promotional indicia 22 may be a vehicle logo, a favorite sports team, etc. In addition, the back and top plates 112, 116 may be formed from various types of materials including, but not limited to, polymeric materials, metals, wood, etc.

In FIG. 2A, 130 designates a carpet system that includes the above-described apparatus 110 and the vehicle carpet 14 and floor mat 18 sandwiched therebetween.

Figure 2B:
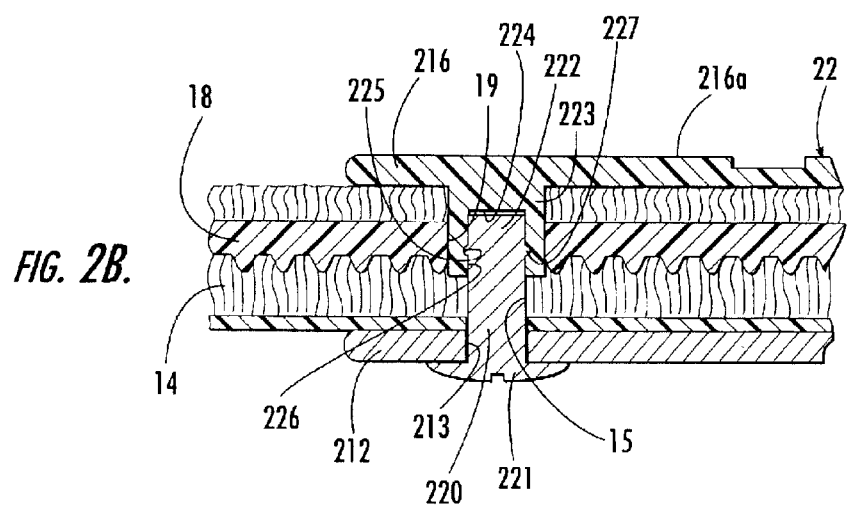

Referring now to FIG. 2B, an apparatus 210 for securing a floor mat to a vehicle carpet in face-to-face contacting relationship, according to embodiments of the present invention, is illustrated. The illustrated apparatus 210 includes a back plate 212 having an aperture 213 formed therethrough, a retention post 220 having an enlarged end 221 and a free end 222, and a top plate 216 configured to be removably secured to the retention post free end 222 such that the carpet 14 and floor mat 18 are sandwiched between the top and back plates 216, 212. The retention post free end 222 extends through the back plate aperture 213 and respective apertures 15, 19 in a vehicle carpet 14 and floor mat 18.

The top plate 216 has a female adapter 223 that is configured to snugly engage the retention post free end 222 and removably secure the top plate 216 to the retention post 220. The female adapter 223 includes a cylindrical chamber 224 having a circumferentially-extending channel 225 formed in a wall 226 thereof. The retention post 220 includes a circumferentially-extending ridge 227 adjacent the free end 222. The diameter of the ridge 227 is slightly larger than the diameter of the cylindrical chamber 224. The female adapter 223 is configured to expand slightly to allow the ridge 227 to move into the cylindrical chamber 224 and engage the channel 225, resulting in a removable, snug fit between the retention post 220 and the top plate 216. However, various configurations known to those skilled in the art may be utilized to removably secure the top plate 216 to the retention post free end 222. Embodiments of the present invention are not limited to the illustrated retention post configuration or to the top plate female adapter configuration.

The top plate 216 may be configured to apply compressive force on the floor mat 18 to facilitate sandwiching the floor mat 18 and vehicle carpet 14 together. In the illustrated embodiment, the top plate 116 has an upper surface 116a that has promotional indicia 22 thereon. There is no limitation to what the promotional indicia may be. For example,
the promotional indicia 22 may be a vehicle logo, a favorite sports team, etc. In addition, the back and top plates 112, 116 may be formed from various types of materials including, but not limited to, polymeric materials, metals, wood, etc.

In FIG. 2B, 230 designates a carpet system that includes the above-described apparatus 210 and the vehicle carpet 14 and floor mat 18 sandwiched therebetween.

Figure 3A:
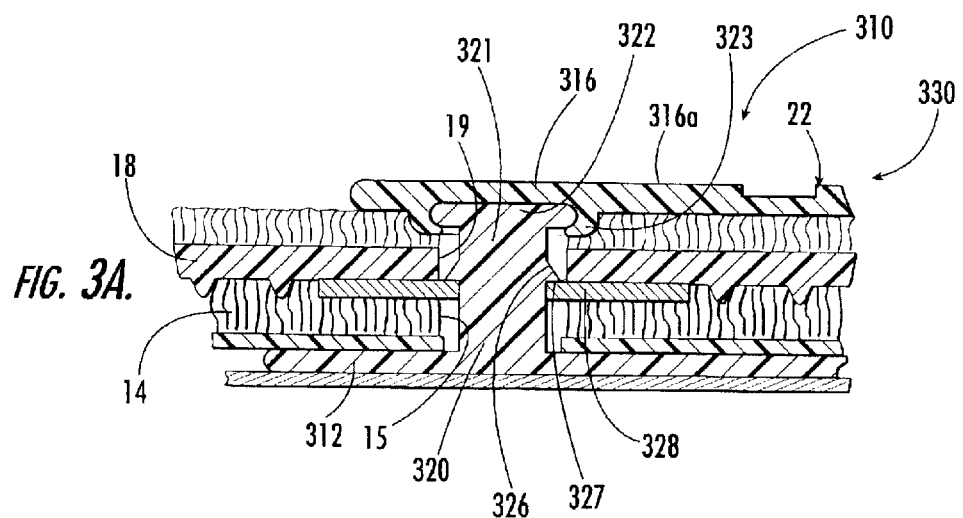

Referring now to FIG. 3A, an apparatus 310 for securing a floor mat to a vehicle carpet in face-to-face contacting relationship, according to embodiments of the present invention, is illustrated. The illustrated apparatus 310 includes a back plate 312 having a retention post 320 extending therefrom and a top plate 316 that is configured to be removably secured to the retention post 320 such that the carpet 14 and floor mat 18 are sandwiched between the top and back plates 316, 312. The illustrated retention post 320 includes a free end 321 having a circumferentially extending ridge 322. The free end 321 extends through respective apertures 15, 19 in a vehicle carpet 14 and floor mat 18. The top plate 316 has a female adapter 323 that is configured to engage the ridge 322 and removably secure the top plate 316 to the retention post 320. The top plate 316 may be configured to apply compressive force on the floor mat 18 to facilitate sandwiching the floor mat 18 and vehicle carpet 14 together. Various configurations known to those skilled in the art may be utilized to removably secure the top plate 316 to the fastener free end 321. Embodiments of the present invention are not limited to the illustrated fastener free end configuration or to the top plate female adapter configuration.

The illustrated retention post 320 also includes a tapered intermediate portion 326 between the free end 321 and the back plate 312. The tapered intermediate portion 326 has a radially extending shoulder 327, as illustrated. A retainer plate 328 (e.g., a washer, etc.) Is utilized to secure the back plate 312 to the carpet 14 by being positioned between the retention post tapered portion shoulder 327 and the carpet 14. The configuration may be designed such that the retainer plate 328 applies a compressive force on the carpet 14.

In the illustrated embodiment, the top plate 316 has an upper surface 316a that has promotional indicia 22 thereon. There is no limitation to what the promotional indicia may be. For example, the promotional indicia 22 may be a vehicle logo, a favorite sports team, etc. In addition, the back and top plates 312, 316 may be formed from various types of materials including, but not limited to, polymeric materials, metals, wood, etc.

In FIG. 3A, 330 designates a carpet system that includes the above-described apparatus 310 and the vehicle carpet 14 and floor mat 18 sandwiched therebetween.

Figure 3B:
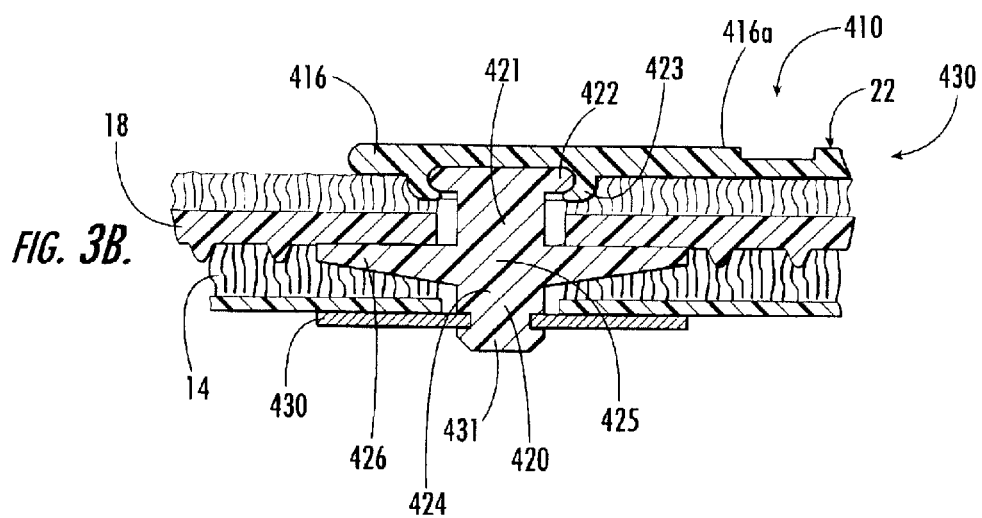

Referring now to FIG. 3B, an apparatus 410 for securing a floor mat to a vehicle carpet in face-to-face contacting relationship, according to embodiments of the present invention, is illustrated. The illustrated apparatus 410 includes a retention post 420, a retention clip 430 that is configured to underlie the carpet 14, and a top plate 416 that is configured to be removably secured to the retention post such that the carpet 14 and floor mat 18 are sandwiched between the top plate 416 and retention clip 440.

The illustrated retention post 420 includes opposite first and second free end portions 421, 431 and an intermediate portion 425 between the first and second end portions 421, 431. A circumferentially-extending slot 424 is formed within the retention post adjacent the second end, and the retention post intermediate portion 425 includes a radially extending flange 426. The retention post 420 is configured to extend through respective apertures 15, 19 in a vehicle carpet 14 and floor mat 18 such that the radially extending flange 426 is disposed between the floor mat 18 and the carpet 14. A retention clip 440 is secured within the slot 424 so as to underlie the carpet 14.

The illustrated retention post first end portion 421 includes a circumferentially extending ridge 422. The first end 421 extends through respective apertures 15, 19 in a vehicle carpet 14 and floor mat 18. The top plate 416 has a female adapter 423 that is configured to engage the ridge 422 and removably secure the top plate 416 to the retention post first end 421. The top plate 416 may be configured to apply compressive force on the floor mat 18 to facilitate sandwiching the floor mat 18 and vehicle carpet 14 together. Various configurations known to those skilled in the art may be utilized to removably secure the top plate 416 to the retention post first end 421. Embodiments of the present invention are not limited to the illustrated retention post first and second end configurations or to the top plate female adapter configuration.

In FIG. 3B, 430 designates a carpet system that includes the above-described apparatus 410 and the vehicle carpet 14 and floor mat 18 sandwiched therebetween.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An apparatus for securing a floor mat to a vehicle carpet, comprising:
   a back plate that underlies a vehicle carpet and that comprises an aperture formed therethrough;
   a top plate that overlies a floor mat and that comprises an aperture formed therethrough; and
   a fastener configured to extend through respective apertures in the carpet and floor mat, and through the back and top plate apertures to removably secure the back and top plates together such that the carpet and floor mat are sandwiched therebetween.

2. The apparatus of claim 1, wherein the top plate comprises an upper surface having promotional indicia thereon.

3. The apparatus of claim 2, wherein the promotional indicia comprises a vehicle logo.

4. The apparatus of claim 1, wherein the back and top plates comprise polymeric material.

5. The apparatus of claim 1, wherein the fastener comprises a portion that is integrally formed with one of the back or top plates.

6. A carpet system for a vehicle, comprising:
   a carpet having an aperture formed therethrough;
   a floor mat in face-to-face contacting relationship with the carpet, wherein the floor mat has an aperture formed therethrough, and wherein the carpet aperture and floor mat aperture are in communication with each other; and
   an apparatus for securing the floor mat to the carpet, comprising:
      a back plate that underlies the carpet and that comprises an aperture formed therethrough;
      a top plate that overlies the floor mat and that comprises an aperture formed therethrough; and
      a fastener configured to extend through the carpet aperture, floor mat aperture, and back and top plate apertures to removably secure the back and top plates together such that the carpet and floor mat are sandwiched therebetween.

7. An apparatus for securing a floor mat to a vehicle carpet, comprising:
   a back plate comprising an aperture formed therethrough;
   a fastener comprising:
      a lower portion that extends through the back plate aperture, and respective apertures in a carpet and floor mat; and
      an upper portion that extends through the floor mat aperture and is removably secured to the fastener lower portion such that the carpet and floor mat are sandwiched between the upper and lower portions, wherein the upper portion comprises a free end that extends above the floor mat; and
   a top plate removably secured to the upper portion free end.

8. The apparatus of claim 7, wherein the top plate comprises an upper surface having promotional indicia thereon.

9. The apparatus of claim 8, wherein the promotional indicia comprises a vehicle logo.

10. The apparatus of claim 7, wherein the back and top plates comprise polymeric material.

11. The apparatus of claim 7, wherein the fastener upper and lower portions are configured to be threadingly engaged with each other.

12. A carpet system for a vehicle, comprising:
   a carpet having an aperture formed therethrough;
   a floor mat in face-to-face contacting relationship with the carpet, wherein the floor mat has an aperture formed therethrough, and wherein the carpet aperture and floor mat aperture are in communication with each other; and
   an apparatus for securing the floor mat to the carpet, comprising:
      a back plate comprising an aperture formed therethrough;
      a fastener comprising:
         a lower portion that extends through the back plate aperture, carpet aperture and floor mat aperture; and
         an upper portion that extends through the floor mat aperture and is removably secured to the fastener lower portion such that the carpet and floor mat are sandwiched between the upper and lower portions, wherein the upper portion comprises a free end that extends above the floor mat; and
      a top plate removably secured to the upper portion free end.

13. An apparatus for securing a floor mat to a vehicle carpet, comprising:
   a back plate comprising an aperture formed therethrough;
   a retention post having an enlarged end and a free end, wherein the free end extends through the back plate aperture and respective apertures in a vehicle carpet and floor mat; and
   a top plate configured to be removably secured to the retention post free end such that the carpet and floor mat are sandwiched between the top and back plates.

14. The apparatus of claim 13, wherein the top plate comprises an upper surface having promotional indicia thereon.

15. The apparatus of claim 14, wherein the promotional indicia comprises a vehicle logo.

16. The apparatus of claim 13, wherein the top and back plates comprise polymeric material.

17. The apparatus of claim 13, wherein the retention post is integrally formed with the back plate.

18. A carpet system for a vehicle, comprising:
 a carpet having an aperture formed therethrough;
 a floor mat in face-to-face contacting relationship with the carpet, wherein the floor mat has an aperture formed therethrough, and wherein the carpet aperture and floor mat aperture are in communication with each other; and
 an apparatus for securing the floor mat to the carpet, comprising:
  a back plate comprising an aperture formed therethrough;
  a retention post having an enlarged end and a free end, wherein the free end extends through the back plate aperture, carpet aperture and floor mat aperture; and
  a top plate configured to be removably secured to the retention post free end such that the carpet and floor mat are sandwiched between the top and back plates.

19. An apparatus for securing a floor mat to a vehicle carpet, comprising:
 a back plate comprising a retention post extending therefrom, wherein the retention post comprises a free end, and wherein the free end extends through respective apertures in a vehicle carpet and floor mat; and
 a top plate configured to be removably secured to the retention post free end such that the carpet and floor mat are sandwiched between the top and back plates.

20. The apparatus of claim 19, wherein the retention post comprises a tapered intermediate portion between the free end and the back plate, wherein the tapered intermediate portion comprises a radially extending shoulder, and further comprising a retainer plate that secures the back plate to the carpet, wherein the retainer plate is positioned between the retention post tapered portion shoulder and the carpet.

21. The apparatus of claim 19, wherein the top plate comprises an upper surface having promotional indicia thereon.

22. The apparatus of claim 21, wherein the promotional indicia comprises a vehicle logo.

23. The apparatus of claim 19, wherein the top and back plates comprise polymeric material.

24. A carpet system for a vehicle, comprising:
 a carpet having an aperture formed therethrough;
 a floor mat in face-to-face contacting relationship with the carpet, wherein the floor mat has an aperture formed therethrough, and wherein the carpet aperture and floor mat aperture are in communication with each other; and
 an apparatus for securing the floor mat to the carpet, comprising:
  a back plate comprising a retention post extending therefrom, wherein the retention post comprises a free end, and wherein the free end extends through the carpet and floor mat apertures; and
  a top plate configured to be removably secured to the retention post free end such that the carpet and floor mat are sandwiched between the top and back plates.

25. An apparatus for securing a floor mat to a vehicle carpet, comprising:
 a retention post comprising opposite first and second free end portions, and an intermediate portion between the first and second end portions, wherein a circumferentially-extending slot is formed within the retention post adjacent the second end, wherein the intermediate portion comprises a radially extending flange, and wherein the retention post is configured to extend through respective apertures in a vehicle carpet and floor mat such that the radially extending flange is disposed between the floor mat and the carpet;
 a retention clip secured within the slot so as to underlie the carpet; and
 a top plate configured to be removably secured to the retention post first free end portion such that the carpet and floor mat are sandwiched between the top plate and retention clip.

26. The apparatus of claim 25, wherein the top plate comprises an upper surface having promotional indicia thereon.

27. The apparatus of claim 26, wherein the promotional indicia comprises a vehicle logo.

28. The apparatus of claim 25, wherein the top and back plates comprise polymeric material.

29. A carpet system for a vehicle, comprising:
 a carpet having an aperture formed therethrough;
 a floor mat in face-to-face contacting relationship with the carpet, wherein the floor mat has an aperture formed therethrough, and wherein the carpet aperture and floor mat aperture are in communication with each other; and
 an apparatus for securing the floor mat to the carpet, comprising:
  a retention post comprising opposite first and second free end portions, and an intermediate portion between the first and second end portions, wherein a circumferentially-extending slot is formed within the retention post adjacent the second end, wherein the intermediate portion comprises a radially extending flange, and wherein the retention post extends through the carpet and floor mat apertures such that the radially extending flange is disposed between the floor mat and the carpet;
  a retention clip secured within the slot and underlying the carpet; and
  a top plate configured to be removably secured to the retention post second free end portion such that the carpet and floor mat are sandwiched between the top plate and retention clip.

* * * * *